United States Patent

[11] 3,615,971

| [72] | Inventor | Glen D. Perry<br>Akron, Ohio |
|---|---|---|
| [21] | Appl. No. | 852,011 |
| [22] | Filed | Aug. 21, 1969 |
| [45] | Patented | Oct. 26, 1971 |
| [73] | Assignee | The General Tire & Rubber Company |

[54] METHOD OF MAKING A SYNTHETIC SUEDE COVERED COMPOSITE ARTICLE
13 Claims, 3 Drawing Figs.

[52] U.S. Cl.................................................. 156/78,
156/79, 156/219, 156/344
[51] Int. Cl................................................... B32b 5/18
[50] Field of Search............................................ 156/77, 78,
79, 344, 209, 212, 219, 220; 101/32; 161/109, 159

[56] References Cited
UNITED STATES PATENTS

| 2,621,138 | 12/1952 | Messing...................... | 156/209 |
| 3,002,868 | 10/1961 | Boivin........................ | 161/159 UX |
| 3,026,231 | 3/1962 | Chavannes................... | 101/32 UX |
| 3,049,463 | 8/1962 | Kallander et al.............. | 156/78 X |
| 3,055,788 | 9/1962 | Stanhope et al.............. | 156/344 X |
| 3,519,527 | 7/1970 | Crowley..................... | 156/79 X |

FOREIGN PATENTS

| 758,036 | 9/1956 | Great Britain............... | 101/32 |

*Primary Examiner*—Benjamin A. Borchelt
*Assistant Examiner*—G. E. Montone
*Attorneys*—John J. Murphey, Frank C. Rote, Jr. and Denbigh S. Matthews ABSTRACT: This invention concerns a process of producing a synthetic suede covered composite article which comprises the steps of fabricating a flexible laminate comprising a layer of nonexpandable vinyl polymer and a layer of expanded vinyl polymer, forming the flexible laminate against a surface wherein the nonexpandable layer is adjacent the surface, applying a backing material to the formed laminate adjacent the expanded layer to make a composite article, removing the composite article from the surface and stripping the nonexpandable layer from the expanded layer to produce a suede surface on the composite article.

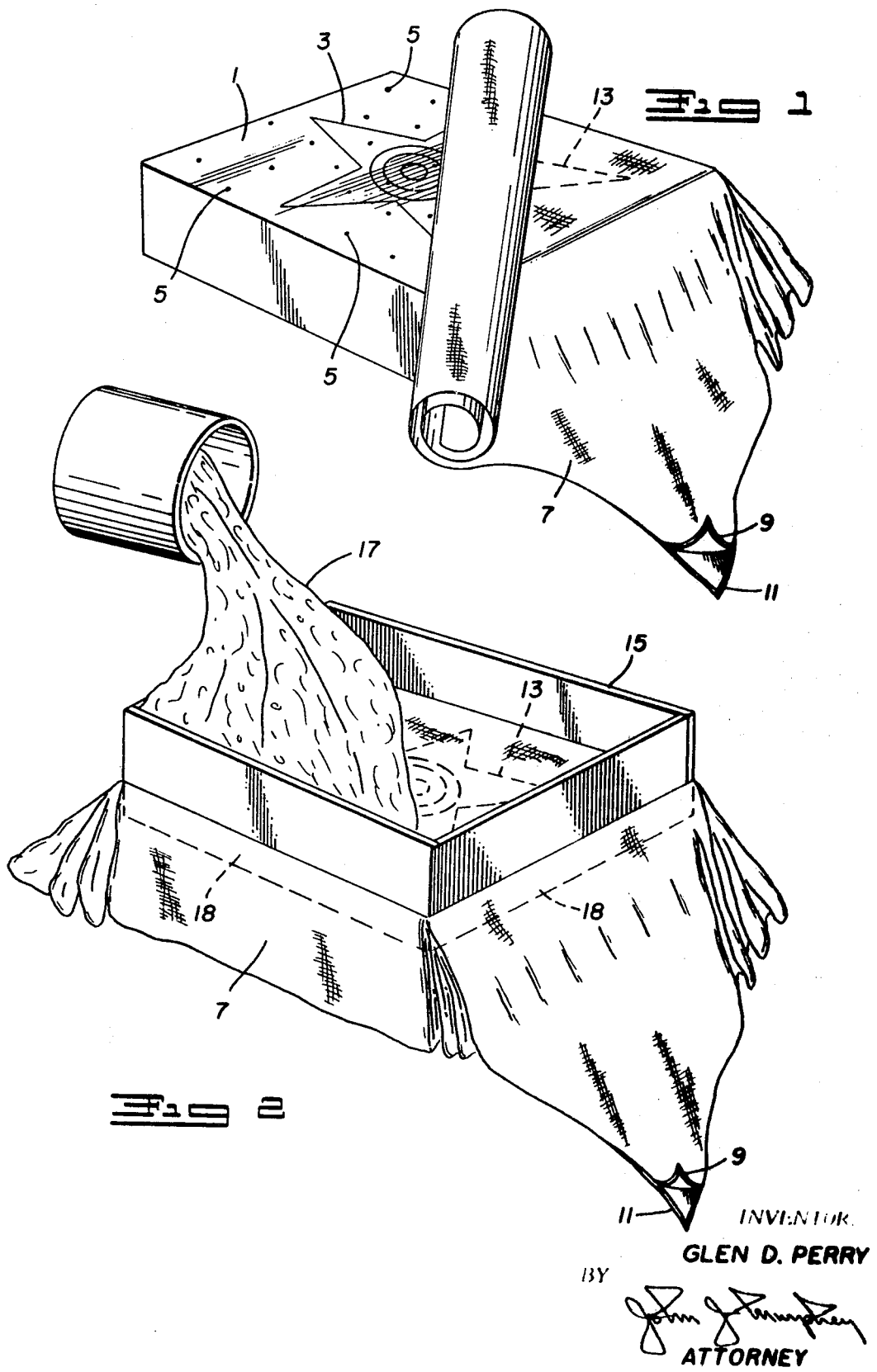

PATENTED OCT 26 1971

INVENTOR.
GLEN D. PERRY
BY
ATTORNEY

METHOD OF MAKING A SYNTHETIC SUEDE COVERED COMPOSITE ARTICLE

BACKGROUND OF THE INVENTION

1. Field of the Invention

This invention relates to the field of synthetic suede materials. More particularly, this invention relates to composite articles and to a method of forming a synthetic suede covering thereon.

2. Description of the Prior Art

A "suede" is defined in Webster's Dictionary as, "A tanned skin with the flesh side rubbed to a nap," and "A fabric prepared so as to simulate the surface to such a tanned skin." This latter definition describes a synthetic suede and is the subject of this invention.

Most suede articles or articles having a suede surface exist as flexible materials. They find many uses in everyday apparel such as shoe coverings, coat cuffs, and gloves. These materials may contain decorations in addition to the pleasing suede surface such as fancy stitching, stitched ribs, and perforations. In some cases, composite items have been made with a suede surface by glueing a synthetic suede material to the surface thereof.

In the many faceted world of modern design, there has come a need for a way to place a synthetic suede finish or covering on a rigid or semirigid composite article having an embossed surface. For instance, in the automobile trade there is a trend toward replacing interior metallic objects with plastic objects. The dash panel, once made of steel, is now almost entirely a soft, plastic coated article retaining only metal as a rigidifying and anchoring means. Smooth plastic dash panels reflect sunlight and tend to throw glint and glare into the driver's eyes. It would be particularly advantageous to apply a synthetic suede finish to the dashboard to eliminate glare and at the same time provide an attractive decoration for the automobile's interior. Where smooth dashboard surfaces are involved, a synthetic suede material may be adhered to the surface. However, if an embossed suede surface is involved, there is practically no known method of producing it.

There are many processes known in the art of making synthetic suede materials. For known it is known to cast a plastisol resin over a surface containing many fine particles (abrasive coated paper such as sandpaper), applying a covering layer to the plastisol, heating the plastisol to gel it and adhere it to the covering material, and then stripping it from the fine-grained surface to produce a synthetic suede finish (U.S. Pat. No. 3,312,586). It is also known in the prior art to cast a solution of polymer on a substrate, coagulate the polymer by bathing it in a liquid that is soluble in the solution solvent and a nonsolvent for the polymer, drying and buffing the material to produce a poromeric synthetic suede (U.S. Pat. No. 3,284,274). These materials, however, when pressed onto an embossed surface either do not take up the details of the embossing, due to the inability of the applied pressure to force the suede material into the contours of the embossing, or if the pressure is increased to force the material into these contours, the suede surface densifies under the increased pressure to produce a "shine." It, therefore, stands that the prior art is devoid of a method of producing a suede surface on a composite article, especially one having an embossed surface.

The term "composite article" is used therein to differentiate a thin, sheetlike material from a thick, bulky article. An example of the former is suede finished sheet material such as that used in the glove industry; an example of the latter is the aforedescribed automobile dashboard. Other examples of composite articles include seat cushions, automobile seats, arm rests, and overhead panelling.

This invention is the discovery that synthetic suede covering can be applied to a composite article wherein the suede conforms to all the embossed details of the surface and yet does not densify (shine). Moreover, the invention may be practiced with a minimum of equipment and may be applied to virtually any article.

Therefore, the main object of this invention is a synthetic suede covered composite article and a method of making it. Other objects include a method of making a composite article having a synthetic suede covering that utilizes a wide variety of both suede-forming and article-backing materials, that does not require special equipment, that may be performed by hand or automatic processes, and that involves virtually no scrap material in that certain pieces of material involved in the process are reusable.

SUMMARY OF THE INVENTION

This invention concerns a process of producing a synthetic suede covered composite article comprising the steps of fabricating a flexible laminate comprising a layer of nonexpandable vinyl polymer and a layer of expanded vinyl polymer, forming the flexible laminate against a surface wherein the nonexpandable layer is adjacent the surface, applying a backing material to the formed laminate adjacent the expanded layer to make a composite article, removing the composite article from the surface, and, stripping the nonexpandable layer from the expanded layer to produce a suede surface on the composite article. The invention also includes the synthetic suede covered composite article produced by this method.

DESCRIPTION OF THE DRAWINGS

FIG. 1 shows the step of forming a flexible laminate against an embossed surface corresponding to the process of this invention.

FIG. 2 shows the step of applying a backing material to the formed laminate corresponding to the process of this invention.

DESCRIPTION OF THE PREFERRED EMBODIMENT

Figure 3:
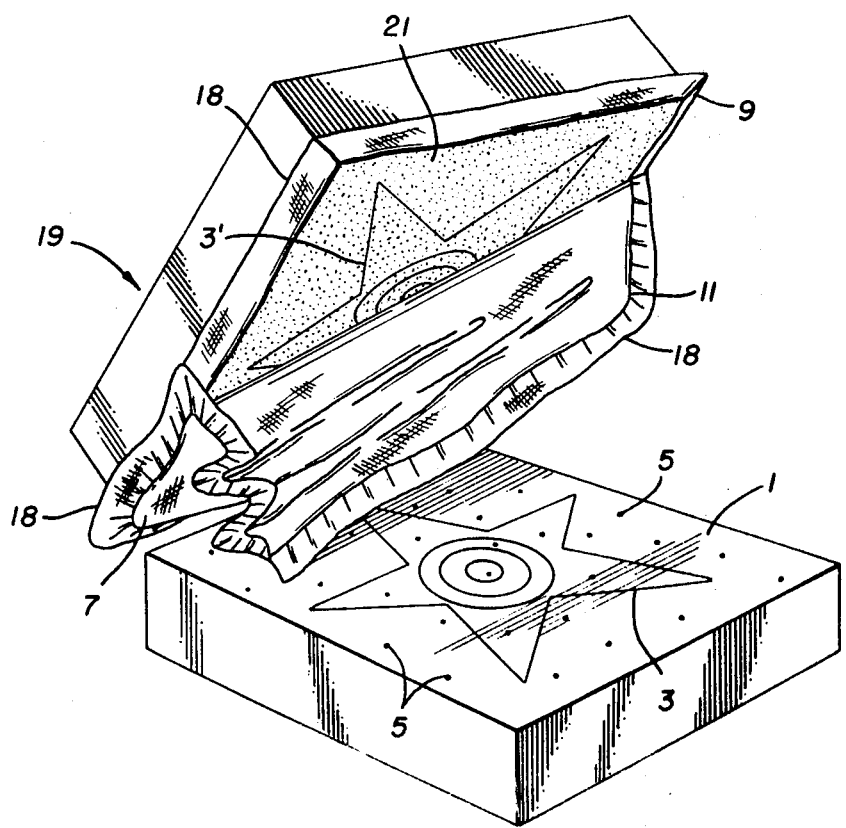
FIG. 3 shows the nonexpanded layer partially stripped from the expanded layer, after removing the composite article from the surface over which it was formed, to reveal part of the synthetic suede surface produced on the composite article corresponding to the process of this invention.

This invention applies to composite articles of the rigid, semirigid, and flexible variety. The suede covering produced by the process of this invention finds wide utilization in articles of comfort, such as cushions and the like, and articles of combined safety, decoration and comfort, such as automobile dashboards, arm rests, sun visors, and the like.

The first step in the process of this invention is to fabricate a flexible laminate comprising a layer of nonexpandable vinyl polymer and a layer of expanded vinyl polymer. This laminate is presently commercially available and methods of making it are well-known in the art; it is most often referred to as "unsupported expanded vinyl."

For instance, a powdered vinyl polymer may be blended with fillers such as calcium carbonate, lubricants such as stearic acid, heat stabilizers such as tin mercaptide, and colorants such as dyes and pigments. This blend is placed in a mixing device such as a Banbury mixer and mixed under high temperature and sheared to form a pasty mass. This mass is then calendered into a thin sheet. Another blend, identical to the one just described, but containing a blowing agent, i.e., a solid material that transforms into a gas at an elevated temperature, such as an azocarbonamide or sulfonyl semicarbazide is incorporated therein. This material is mixed and calendered and these two sheets are joined together in the nip of a hot mill to adhere the two sheets to form a laminate and to gassify the blowing agent to produce a foam in the one layer.

Another way of making the laminate used in this invention is to form a first sheet of vinyl polymer, as described above, and on to that sheet cast a thin layer of vinyl plastisol resin containing the blowing agent. This laminate is cured in an oven at a temperature sufficient to gel and fuse the plastisol resin, adhere the two layers together, and gassify the blowing agent to produce a foam in the one layer.

These same methods may be employed at a reduced temperature to form a laminate wherein the layer containing the blowing agent is not foamed. This is done by calendering the two sheets together at a temperature below that which would cause the blowing agent to gassify. This type of laminate then comprises a layer of nonexpandable vinyl polymer and a layer of expandable (but not expanded) vinyl polymer. This type of laminate may also be utilized in the process of this invention as will be more fully explained later.

The laminate comprising a layer of nonexpandable vinyl polymer and expanded vinyl polymer may contain more layers than the two just described such as, for instance, the laminate may have an extra layer of polymer adjacent the layer of expanded vinyl polymer on the opposite surface from that which is adhered to the layer of nonexpandable vinyl polymer. This may be used when it is desired to produce a more resilient synthetic suede covering on the composite article. It is, however, a requirement of this invention that the laminate consist of at least one layer of nonexpandable vinyl polymer in adherence with a layer of expandable vinyl polymer.

Referring particularly to the drawings, wherein like parts are designated by like numbers of reference throughout the three figures, the second step of the process of this invention is shown in FIG. 1. In FIG. 1 there is pictured a surface 1 containing an embossed decoration 3. In addition to embossed decoration 3 on surface 1, there are shown a plurality of fine holes 5 for pulling, i.e., by vacuum, a covering into tight contact with surface 1. Holes 5 are connected to a vacuum source (not shown).

Flexible laminate 7 is comprised of expanded layer 9 and nonexpandable layer 11. In the figure, laminate 7 is draped over surface 1 and a vacuum pulled through holes 5 to force laminate 7 against surface 1 and down into the contours of embossed decoration 3. Note that nonexpandable layer 11 of flexible laminate 7 is adjacent surface 1 in this process.

There are other means of forming flexible laminate 7 against surface 1 such as by hand, i.e., by pressing laminate 7 against surface 1 using the fingers to push expanded layer 9 down into the contours of embossed decoration 3. In addition, the well-known diaphragm method may be used wherein a flexible diaphragm is placed over flexible laminate 7, after it is draped over surface 1, and pressure applied to laminate 7 by expanding the diaphragm against it. All these and other means for forming flexible laminate 7 against surface 1 are contemplated in this invention.

After flexible laminate 7 is formed against surface 1, there will be a very light outline of the embossed details of embossed decoration 3—this outline is shown as dotted lines 13.

Surface 1 may be any surface over which it is desired to form an identical mirror image having a suede covering. Surface 1 may be polished steel mold surface, a "lost wax" molded surface of an object d'art, or any surface. Surface 1 need not always be rigid, however, the amount of detail resulting from the process of this invention is directly proportional to the amount of detail achieved by pressing flexible laminate 7 into the embossed contours of surface 1 so that the greater the surface rigidity, the better the ensuing detail.

FIG. 2 shows the next step in the process of this invention, that of applying a backing material to the formed laminate. First, yet not altogether required, dam 15 is placed along the perimeter of surface 1 and atop formed flexible laminate 7 to prevent spilling or leaking of the backing material. Backing material 17 is then applied over expanded layer 9 of laminate 7. Backing material 17 will flow over laminate 7 and into outline 13 corresponding to embossed decoration 3. In addition, backing material 17 tightly adheres to expanded layer 9 and, in doing so, makes a composite article, generally indicated at 19 in FIG. 3.

Backing material 17 may comprise a variety of materials depending upon the intended use of composite article 19. If the intended use is for cushioning, backing material 17 may comprise a flexible polymeric material such as flexible or semirigid polyurethane foam. If the composite article is to be used as a protective device, such as a crash panel of a dashboard in an automobile, backing material 17 may comprise a rigid or semirigid (or both) polymeric material such as polyvinyl chloride or polyurethane foam. If the composite article is to be used merely as a decoration, then backing material 17 may comprise a rigid material such as plaster of Paris or glued cardboard or the like. Whatever is used as backing material 17, its primary requirements are that it enter into outline 13 and form a tight bond with expanded layer 9 of flexible laminate 7.

After backing material 17 is applied to expanded layer 9 of flexible laminate 7, it should be allowed to harden such as by cross-linking in the case of polyurethane foams or react as in the case of plaster of Paris or dry as in the case of glued cardboard In addition flexible laminate 7 may be trimmed to the edge of dam 15; such trimming is indicated in dotted lines as edge 18.

An exceptional backing material for use in this invention is polymeric foam known as polyurethane foam. Polyurethane foam is lightweight, relatively inexpensive, chemically inert, resistant to aging, and relatively easy to apply to the flexible laminate of this invention. It is extremely amenable to automatic processing wherein the mixture of foam reactants may be poured from a mixing nozzle directly into the volume defined by expanded layer 9 and dam 15 to react and billow into a foam that possesses, in the cured state, all of the aforedescribed advantages. In addition, rigid polyurethane foam has been found to be an extremely valuable safety material for automobile interiors such as for crash pads and head rests. By using polyurethane foam in connection with this invention, there may be produced, at high output rates, a relatively inexpensive article having a synthetic suede coating for use therein.

FIG. 3 shows part of the final step in the process of this invention, i.e., after composite article 19 is removed from surface 1, nonexpandable layer 11 is stripped from expanded layer 9 to reveal suede covering 21 and the identical embossed decoration 3' corresponding to embossed decoration 3. Generally, when nonexpandable layer 11 is stripped from expandable layer 9, the cell walls that are generally perpendicular to the plane of expanded layer 9 and traversing from one surface to the other surface of expanded layer 9 are ruptured or torn in half so that suede covering 21 is formed as an adhering vinyl surface to backing 17 having very fine vertical cell walls integral therewith. Suede covering 21, however, is not capable of an adequate description except as being the product produced by this inventive process.

The steps of forming flexible laminate 7 against surface 1 and applying backing material 17 to expanded layer 9 may, in some cases, lead to a condition wherein nonexpandable layer 11 becomes somewhat adhered to surface 1; this may be through mere pressure, i.e., mechanical adherence or through some form of chemical bonding with surface 1. Where this condition arises, it may well be desirable to utilize a material of the class generally known as "mold release agents." These agents are applied to surface 1 in a thin layer such as by spraying, brushing on, etc. and form a very thin barrier between surface 1 and nonexpandable layer 11 to prevent this adhering condition from arising. Care must be taken, however, to insure that the amount of release agent is not of such magnitude either to produce lumps or other irregularities on the smooth parts of surface 1 or to fill up the contours of embossed decoration 3 to where the details of it cannot be transmitted to expanded layer 9.

Nonexpandable layer 11 may be stripped from expanded layer 9 by many methods. For instance, nonexpandable layer 11 may be merely peeled back from expanded layer 9 and pulled away by hand. This is most conveniently done just after composite article 19 is removed from surface 1. In addition, nonexpandable layer 11 may be rolled upon a small diameter shaft and rolled completely from expanded layer 9 by automatic means. These and other means are contemplated in this invention. It has been found convenient to heat nonexpandable layer 11 prior to stripping it from expanded layer 9; evidently, the increase in temperature causes softening of the cell walls in expanded layer 9 and lowers the tear resistance thereof.

In addition to dam 15, backing material 17 may be applied throughout a mold container wherein the surface of backing material 17 conforms to some specific configuration such as the back of an automobile seat, the mating surface of the dashboard backing strip, or the like. Further, backing material 17 may be of itself a multilayered material wherein the surface adjacent synthetic suede covering 21 (and embossed decoration 3') may be of one material, such as a flexible foam, and a back up surface laid thereover, such as a formed solid plastic panel, or even a metal anchor plate. All of these modifications are fully contemplated in this invention.

After being stripped from expanded layer 9, nonexpanded layer 11 contains a thin film or remnant of expanded layer 9. Nonexpanded layer 11 may thereafter be reused by either readhering it to another layer of expanded material, corresponding to expanded layer 9, or it may be recoated with a vinyl plastisol blend (heretofore described) that contains a blowing agent. This relaminating may be accomplished on either surface of nonexpandable layer 11, i.e., either that side containing the residual one-half thickness of expanded layer 9 or the smooth side that was originally placed adjacent surface 1. From a practical standpoint, it would be desirable to recoat or relaminate nonexpandable layer 11 on the same side that expanded layer 9 was originally adhered to so that there would remain a smooth surface of nonexpandable layer 11 for which to form against another surface. In this regard nonexpandable layer 11 will usually be of sufficient flexibility and thinness (10 to 20 mils) so that after removal from expanded layer 9 it will lose the embossed decoration (outline 13) imparted to it by embossed decoration 3.

As a separate embodiment of this invention, the process may be modified so that flexible laminate 7 comprises not expanded layer 9 but expandable (but not expanded) layer 9'. By expandable layer is meant a layer that contains a blowing agent that has not yet been gassified. In this modified form of the invention, flexible laminate 7 will comprise nonexpandable layer 11 and expandable layer 9'. Flexible laminate 7 is formed against a surface wherein nonexpandable layer 11 is adjacent the surface, as has been heretofore described in the basic process. After forming, flexible laminate 7 is heated to gassify the blowing agent in expandable layer 9' to form the same expanded layer—nonexpandable layer flexible laminate of the basic process. Using this modification of the process, one may control the degree of expansion of the synthetic suede covering and obtain an additional degree of control over the process.

Also as a separate embodiment of this invention, the modified process, described above, may be further modified by interchanging the steps of heating expandable layer 9', to form expanded layer 9, and applying backing material 17 to formed laminate 7. In this process, flexible laminate 7, comprising nonexpandable layer 11 and expandable (but not expanded) layer 9' is formed against surface 1 as described earlier. Backing material 17 is then applied to formed laminate 7 (adjacent expandable layer 9') to form composite article 19. Then expandable layer 9' is heated to gassify the blowing agent and produce the same expanded layer 9 as described earlier. This heating step may comprise none, part, or all of a curing step for backing material 17, if said material is capable of curing or, may comprise none, part, or all of a drying step for backing material 17, if said material is capable of drying. This modified process permits not only a greater latitude in the basic process but may eliminate the step of post-heating expandable layer 11 during the stripping step, i.e., when nonexpandable layer 11 is stripped from expanded layer 9.

I claim:

1. A process of producing a synthetic suede covered composite article comprising the steps of:
    a. fabricating a flexible laminate comprising:
        1. a layer of nonexpandable vinyl polymer, and
        2. a layer of expanded vinyl polymer in full adherence therewith;
    b. forming said flexible laminate against a surface wherein said nonexpandable layer is adjacent said surface;
    c. applying a backing material to said formed laminate, adjacent said expanded layer to make a composite article;
    d. removing said composite article from said surface, and;
    e. stripping said nonexpandable layer from said expanded layer to produce a suede surface on said composite article.

2. A process of producing a synthetic suede coated composite article comprising the steps of:
    a. fabricating a flexible laminate comprising:
        1. a layer of nonexpandable vinyl polymer, and
        2. a layer of expandable vinyl polymer in full adherence therewith;
    b. forming said flexible laminate against a surface wherein said nonexpandable layer is adjacent said surface;
    c. heating said flexible laminate to expand said layer of expandable vinyl polymer;
    d. applying a backing material to said formed laminate, adjacent said expanded layer to make a composite article;
    e. removing said composite article from said surface, and;
    f. stripping said nonexpandable layer from said expanded layer to produce a suede surface on said composite article.

3. A method of producing a synthetic suede covered composite article, as described in claim 1, wherein said surface against which said flexible laminate is formed is an embossed surface.

4. A method of producing a synthetic suede covered composite article, as described in claim 2, wherein said surface against which said flexible laminate is formed is an embossed surface.

5. A process of producing a synthetic suede covered composite article, as described in claim 1, wherein said layer of nonexpandable vinyl polymer has been previously stripped from an expanded layer of vinyl polymer in a preceding process.

6. A process of producing a synthetic suede covered composite article, as described in claim 2, wherein said layer of nonexpandable vinyl polymer has been previously stripped from an expanded layer of vinyl polymer in a preceding process.

7. A process of producing a synthetic suede covered composite article, as described in claim 1, wherein said step of forming said flexible laminate against said surface is conducted by vacuum forming.

8. A process of producing a synthetic suede covered composite article, as described in claim 2, wherein said step of forming said flexible laminate against said surface is conducted by vacuum forming.

9. A process of producing a synthetic suede covered article, as described in claim 1, 2, wherein said backing material is foam.

10. A process of producing a synthetic suede covered article, as described in claim 2, wherein said backing material is a foam.

11. A process of producing a synthetic suede covered article, as described in claim 1, wherein said backing material is a polyurethane foam.

12. A process of producing a synthetic suede covered article, as described in claim 2, wherein said backing material is a polyurethane foam.

13. A process of producing a synthetic suede coated composite article comprising the steps of:
    a. fabricating a flexible laminate comprising:
        1. a layer of nonexpandable vinyl polymer, and
        2. a layer of expandable vinyl polymer in full adherence therewith;
    b. forming said flexible laminate against a surface wherein said nonexpandable layer is adjacent said surface;
    c. applying a backing material to said formed laminate, adjacent said expandable layer to make a composite article;

d. heating said flexible laminate to expand said layer of expandable vinyl polymer;
e. removing said composite article from said surface, and;
f. stripping said nonexpandable layer from said expanded layer to produce a suede surface on said composite article.

* * * * *

PO-1050
(5/69)

UNITED STATES PATENT OFFICE
CERTIFICATE OF CORRECTION

Patent No. 3,615,971          Dated October 26, 1971

Inventor(s) Glen D. Perry

It is certified that error appears in the above-identified patent and that said Letters Patent are hereby corrected as shown below:

Column 1, line 43, the phrase "for known, it is known" should read --for instance, it is known--.
Column 3, line 45, the phrase "for forming" should read --of forming--.
Column 3, line 53, the phrase "object d'art" should read --objet d'art--.
Column 6, line 55, Claim 9 the phrase "described in Claim 1, 2, wherein" should read --described in Claim 1, wherein--.

Signed and sealed this 18th day of April 1972.

(SEAL)
Attest:

EDWARD M. FLETCHER, JR.
Attesting Officer

ROBERT GOTTSCHALK
Commissioner of Patents